(12) United States Patent
Yen et al.

(10) Patent No.: US 10,205,817 B2
(45) Date of Patent: Feb. 12, 2019

(54) METHOD, DEVICE AND STORAGE MEDIUM FOR CONTROLLING SCREEN STATE

(71) Applicant: Beijing Xiaomi Mobile Software Co., Ltd., Haidian District, Beijing (CN)

(72) Inventors: Chiafu Yen, Beijing (CN); Nannan Wang, Beijing (CN); Dawei Xiong, Beijing (CN)

(73) Assignee: BEIJING XIAOMI MOBILE SOFTWARE CO., LTD., Haidian District, Beijing (CN)

( * ) Notice: Subject to any disclaimer, the term of this patent is extended or adjusted under 35 U.S.C. 154(b) by 0 days.

(21) Appl. No.: 15/791,380

(22) Filed: Oct. 23, 2017

(65) Prior Publication Data
US 2018/0115639 A1 Apr. 26, 2018

(30) Foreign Application Priority Data
Oct. 24, 2016 (CN) .......................... 2016 1 0936722

(51) Int. Cl.
*H04M 1/725* (2006.01)
*H04W 52/02* (2009.01)

(52) U.S. Cl.
CPC ... *H04M 1/72569* (2013.01); *H04M 1/72577* (2013.01); *H04W 52/027* (2013.01); *H04M 2250/12* (2013.01); *Y02D 70/00* (2018.01)

(58) Field of Classification Search
CPC ......... H04M 1/72569; H04M 1/72577; H04M 19/04; H04M 2250/12; H04W 52/02;
(Continued)

(56) References Cited

U.S. PATENT DOCUMENTS

2011/0054650 A1* 3/2011 Wang .................... H04M 19/04
700/94
2013/0229442 A1* 9/2013 Yang ................. H04W 52/0254
345/690
(Continued)

OTHER PUBLICATIONS

Extended European search report of European Patent Application No. 17198093.1, from the European Patent office, dated Feb. 21, 2018.

*Primary Examiner* — Thanh Le
(74) *Attorney, Agent, or Firm* — Jun He Law Offices P.C.; James J. Zhu (57) ABSTRACT

The present disclosure relates to a method, device and storage medium for controlling a screen state. The method includes: transmitting an ultrasonic transmission-signal for N times within a preset time period when detecting that an ultrasonic sensing function of the terminal is enabled, N being an integer greater than 1; receiving an ultrasonic receipt signal; generating N determination results of whether the terminal is covered, wherein each of the N determination results is based on one of the N times transmission of the ultrasonic transmission-signal and receipt of the corresponding ultrasonic receipt signal; and determining that the terminal is covered and switching the screen state of the terminal from a turn-on state to a turn-off state, when at least one of the N determination results indicates that the terminal is covered. In the technical solution, whether the terminal is covered is determined by obtaining a value of the determination result for successive multiple times within a certain time period. Thus, it may improve the accuracy of the determination, and overcome the defects in the related art where incorrect determination causes misjudgment operation such as a screen flickering. As a result, user experience can be improved.

17 Claims, 8 Drawing Sheets

(58) Field of Classification Search
CPC ........... H04W 52/027; H04W 52/0251; H04W 52/0254; G06F 1/1626
See application file for complete search history.

(56) References Cited

U.S. PATENT DOCUMENTS

| | | |
|---|---|---|
| 2013/0257583 A1 | 10/2013 | Sinha |
| 2017/0013562 A1* | 1/2017 | Lim ..................... G06F 1/1626 |
| 2018/0059717 A1* | 3/2018 | Kim ..................... G06F 1/1626 |

\* cited by examiner

METHOD, DEVICE AND STORAGE MEDIUM FOR CONTROLLING SCREEN STATE

CROSS-REFERENCE TO RELATED APPLICATIONS

This application is based upon and claims priority to Chinese Patent Application No. 201610936722.7, filed Oct. 24, 2016, the entire contents thereof are incorporated herein by reference.

TECHNICAL FIELD

The present disclosure generally relates to the technical field of electronic devices, and more particularly, to a method, device and storage medium for controlling a screen state.

BACKGROUND

A terminal generally has the screen turn-off function. For example, when a user is making a call by a terminal, the terminal may automatically turn off the screen if the terminal is put adjacent to an ear of the user.

In the related art, by enabling an ultrasonic sensing function of the terminal, the terminal may control the turn-off of the screen when an object covering the terminal is detected, so as to save power consumption and prevent unintended user operations.

SUMMARY

In order to overcome the problem existing in the related art, embodiments of the present disclosure provide a method, device and storage medium for controlling a screen state. The technical solutions are as follows.

According to a first aspect of the embodiments of the present disclosure, there is provided a method for controlling a screen state, including:

transmitting an ultrasonic transmission-signal for N times within a preset time period when detecting that an ultrasonic sensing function of the terminal is enabled, N being an integer greater than 1;

receiving an ultrasonic receipt signal;

generating N determination results of whether the terminal is covered, wherein each of the N determination results is based on one of the N times transmission of the ultrasonic transmission-signal and receipt of the corresponding ultrasonic receipt signal; and determining that the terminal is covered and switching the screen state of the terminal from a turn-on state to a turn-off state, when at least one of the N determination results indicates that the terminal is covered.

According to a second aspect of the embodiments of the present disclosure, there is provided a device for controlling a screen state, including:

a signal transmitting module configured to transmit an ultrasonic transmission-signal for N times within a preset time period when detecting that an ultrasonic sensing function of the terminal is enabled, N being an integer greater than 1;

a signal receiving module configured to receive an ultrasonic receipt signal;

a deciding module configured to generate N determination results of whether the terminal is covered, wherein each of the N determination results is based on one of the N times transmission of the ultrasonic transmission-signal and receipt of the corresponding ultrasonic receipt signal;

a first determining module configured to that the terminal is covered, when at least one of the N determination results indicates that the terminal is covered; and a first switching module configured to switch the screen state of the terminal from a turn-on state to a turn-off state.

According to a third aspect of the embodiments of the present disclosure, there is provided a device for controlling a screen state, including:

a processor; and a memory for storing instructions executable by the processor;

wherein the processor is configured to:

transmit an ultrasonic transmission-signal for N times within a preset time period when detecting that an ultrasonic sensing function of the terminal is enabled, N being an integer greater than 1;

receive an ultrasonic receipt signal;

generate N determination results of whether the terminal is covered, wherein each of the N determination results is based on one of the N times transmission of the ultrasonic transmission-signal and receipt of the corresponding ultrasonic receipt signal; and determine that the terminal is covered and switching the screen state of the terminal from a turn-on state to a turn-off state, when at least one of the N determination results indicates that the terminal is covered.

According to a fourth aspect of the embodiments of the present disclosure, there is provided a non-transitory computer-readable storage medium having stored therein instructions that, when executed by a processor of a mobile terminal, causes the mobile terminal to perform a method for controlling a screen state, the method comprising:

transmitting an ultrasonic transmission-signal for N times within a preset time period when detecting that an ultrasonic sensing function of the terminal is enabled, N being an integer greater than 1;

receiving an ultrasonic receipt signal;

generating N determination results of whether the terminal is covered, wherein each of the N determination results is based on one of the N times transmission of the ultrasonic transmission-signal and receipt of the corresponding ultrasonic receipt signal; and determining that the terminal is covered and switching the screen state of the terminal from a turn-on state to a turn-off state, when at least one of the N determination results indicates that the terminal is covered.

It is to be understood that both the foregoing general description and the following detailed description are exemplary only and are not restrictive for the present disclosure.

BRIEF DESCRIPTION OF THE DRAWINGS

The accompanying drawings herein, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description is related to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In the related art, a user may enable an ultrasonic sensing function of a terminal. Then, when the user is making a call by the terminal, if the user puts the terminal close to his ear, the terminal may detect an obstruction and control the terminal to turn off the screen, so as to save power consumption and prevent unintended user operations. However, there are some defects in the related art. For example, in the related art, whether an obstruction exists is determined through a single test of transmitting and receiving an ultrasonic. However, if the obstruction moves at a relatively low frequency and the obstruction does not move during the single test, the terminal may determine that no obstruction exists and do not perform the ultrasonic sensing function. This may bring about an incorrect determination result and cause misjudgment operation such as screen flickering, thereby influencing user experience.

In order to solve the above defect, an embodiment of the present disclosure provides a method for controlling a screen state of a terminal, the method including: transmitting an ultrasonic transmission-signal for N times within a preset time period when detecting that an ultrasonic sensing function of the terminal is enabled, N being an integer greater than 1; receiving an ultrasonic receipt signal; generating N determination results of whether the terminal is covered, wherein each of the N determination results is based on one of the N times transmission of the ultrasonic transmission-signal and receipt of the corresponding ultrasonic receipt signal; and determining that the terminal is covered and switching the screen state of the terminal from a turn-on state to a turn-off state, when at least one of the N determination results indicates that the terminal is covered. Thus, it may improve the accuracy of determination, and overcome the defects in the related art where incorrect determination causes misjudgment operation such as screen flickering. As a result, user experience can be improved.

The technical solution of the embodiment of the present disclosure may be applied to an occasion where the ultrasonic detection function can be used to determine whether a terminal is covered. The terminal may be a smart phone, a smart watch, a smart band, a smart appliance and other devices equipped with an ultrasonic sensing function.

Figure 1:
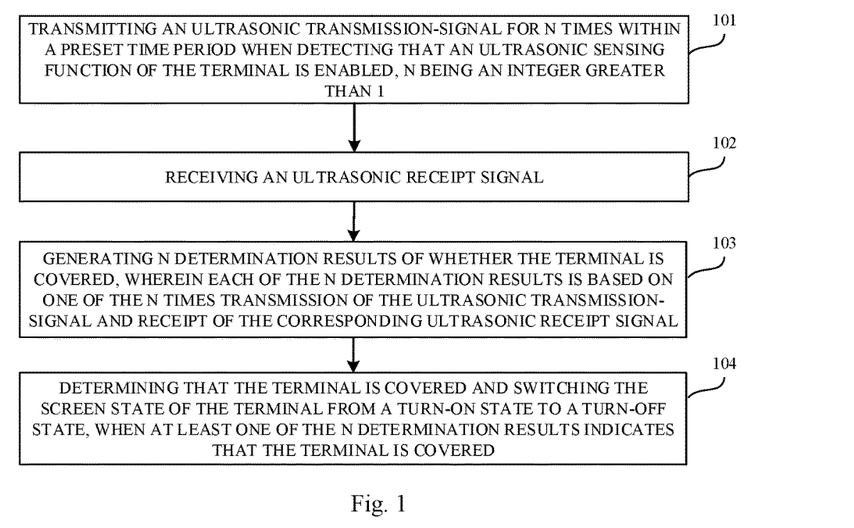
FIG. 1 is a flowchart illustrating a method for controlling a screen state according to an exemplary embodiment.

FIG. 1 is a flowchart illustrating a method for controlling a screen state according to an exemplary embodiment. The method may be performed by a terminal. As shown in FIG. 1, the method may include the following steps 101-104.

At step 101, transmitting an ultrasonic transmission-signal for N times within a preset time period when detecting that an ultrasonic sensing function of the terminal is enabled, N being an integer greater than 1.

As an example, after the terminal starts a phone call and it is detected that an ultrasonic sensing function of the terminal is enabled, N times of ultrasonic-based obstruction tests can be performed by transmitting an ultrasonic transmission-signal for N times successively within a preset time period.

At step 102, receiving an ultrasonic receipt signal.

In one embodiment, for the ultrasonic transmission-signal transmitted by the terminal for N times, an ultrasonic receipt signal returned by an object may be received by the terminal.

At step 103, generating N determination results of whether the terminal is covered, wherein each of the N determination results is based on one of the N times transmission of the ultrasonic transmission-signal and receipt of the corresponding ultrasonic receipt signal.

In one embodiment, for each ultrasonic-based obstruction test, the terminal makes an obstruction determination based on the ultrasonic transmission-signal and the corresponding ultrasonic receipt signal for the obstruction test. N determination results are obtained after N times of ultrasonic-based obstruction tests are completed.

At step 104, determining that the terminal is covered and switching the screen state of the terminal from a turn-on state to a turn-off state, when at least one of the N determination results indicates that the terminal is covered.

As an example, the screen state of the terminal may include at least a turn-on state and a turn-off state. The turn-on state refers to a state at which the screen of the terminal is turned on and operable by the user. The turn-off state refers to a state at which the screen of the terminal is turned off.

In the technical solution provided by the embodiment of the present disclosure, whether the terminal is covered is determined by obtaining a value of the determination result for successive multiple times within a certain time period. Thus, it may improve the accuracy of the determination, and overcome the defects in the related art where incorrect determination causes misjudgment operation such as a screen flickering. As a result, user experience can be improved.

Figure 2:
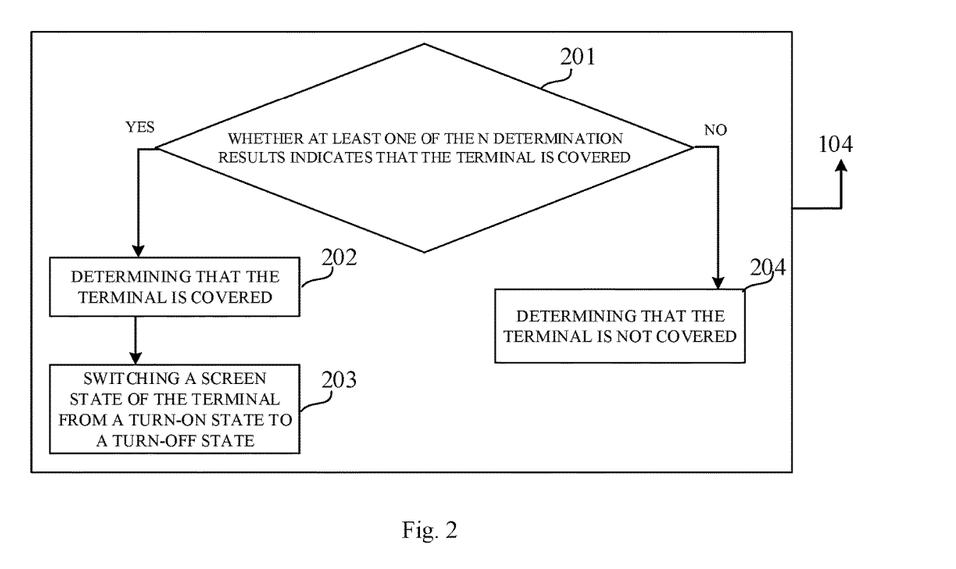
FIG. 2 is a flowchart illustrating a step 104 of the method for controlling a screen state according to an exemplary embodiment.

In one implementation, as shown in FIG. 2, the step 104 may be implemented as steps 201-204.

At step 201, determining whether at least one of the N determination results indicates that the terminal is covered. When at least one of the N determination results indicates that the terminal is covered, step 202 is performed, and when none of the N determination results indicates that the terminal is covered, step 204 is performed.

At step 202, determining that the terminal is covered.

At step 203, switching a screen state of the terminal from a turn-on state to a turn-off state, and the process is ended.

At step 204, determining that the terminal is not covered.

In the above embodiment of the present disclosure, whether the terminal is covered is determined by obtaining the ultrasonic receipt signal for successive N times within a certain time period, and it can determined that the terminal is not covered only when none of the N determination results indicates that the terminal is covered. Thus, it may improve the accuracy of the determination, and overcome the defects in the related art where incorrect determination causes misjudgment operation such as a screen flickering. As a result, user experience can be improved.

Figure 3:
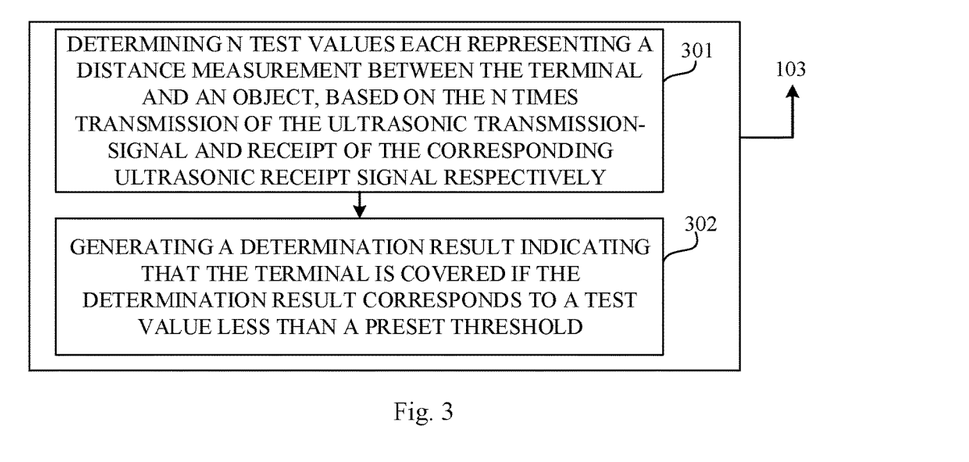
FIG. 3 is a flowchart illustrating a step 103 of the method for controlling a screen state according to an exemplary embodiment.

In one implementation, as shown in FIG. 3, the step 103 may be implemented as steps 301 and 302.

At step 301, determining N test values each representing a distance measurement between the terminal and an object, based on the N times transmission of the ultrasonic transmission-signal and receipt of the corresponding ultrasonic receipt signal respectively.

At step 302, generating a determination result indicating that the terminal is covered if the determination result corresponds to a test value less than a preset threshold.

As an example, the N times of ultrasonic-based obstruction tests are analyzed respectively. For each ultrasonic-based obstruction test, the terminal may determine a test value representing the distance measurement between the terminal and an object based on the ultrasonic transmission-signal and corresponding ultrasonic receipt signal. When a test value is less than a preset threshold and the object is moving, it is determined the terminal is covered. That is, the determination result obtained from that the test indicates that the terminal is covered. N determination results are obtained after all of the N test values are analyzed successively.

In the above embodiment of the present disclosure, the determination result may be more accurate by: determining N test values each representing a distance measurement between the terminal and an object based on the N times transmission of the ultrasonic transmission-signal and receipt of the corresponding ultrasonic receipt signal respectively, and generating a determination result indicating that the terminal is covered if the determination result corresponds to a test value less than a preset threshold.

In one implementation, the step 301 may be implemented as the following step a.

At step a, determining each of the N test values according to an ultrasonic propagation speed, a sending time of the ultrasonic transmission-signal and a receipt time of the corresponding ultrasonic receipt signal.

In the above embodiment of the present disclosure, an implementation is provided in which each of the N test values is determined according to an ultrasonic propagation speed, a sending time of the ultrasonic transmission-signal and a receipt time of the corresponding ultrasonic receipt signal. Thus, it may reduce the complexity of the operation and improve the efficiency of the implementation.

In one implementation, the step 301 may be implemented as the following step b.

At step b, determining each of the N test values according to a difference between an amplitude of the ultrasonic transmission-signal and an amplitude of the corresponding ultrasonic receipt signal.

In the above embodiment of the present disclosure, an implementation is provided in which each of the N test values is determined according to a difference between an amplitude of the ultrasonic transmission-signal and an amplitude of the corresponding ultrasonic receipt signal. Thus, it may reduce the complexity of the operation and improve the efficiency of the implementation.

Figure 4:
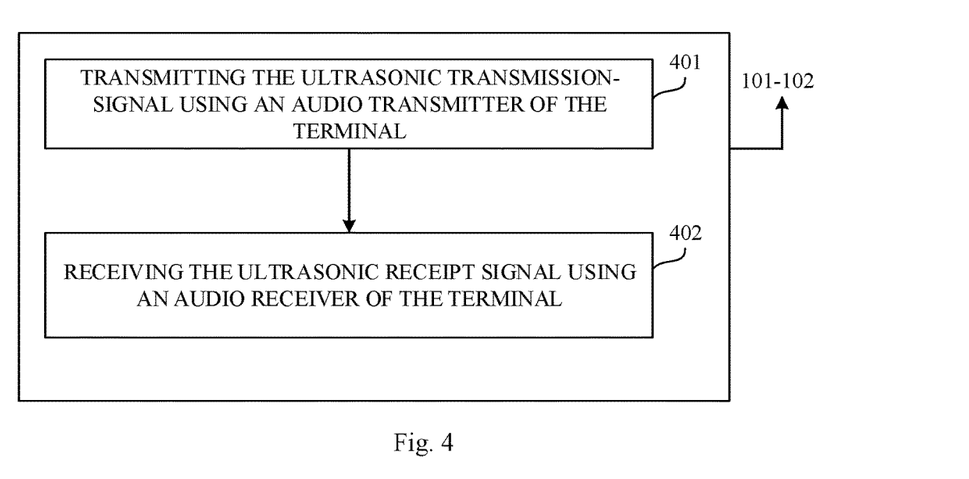
FIG. 4 is a flowchart illustrating steps 101-102 of the method for controlling a screen state according to an exemplary embodiment.

In one implementation, as shown in FIG. 4, the steps 101-102 may be implemented as steps 401-402.

At step 401, transmitting the ultrasonic transmission-signal using an audio transmitter of the terminal.

As an example, the audio transmitter of the terminal may be a speaker or an ultrasonic sounder of the terminal.

At step 402, receiving the ultrasonic receipt signal using an audio receiver of the terminal.

As an example, the audio receiver of the terminal may be a microphone of the terminal.

In the embodiment of the present disclosure, the ultrasonic transmission-signal is transmitted using an audio transmitter of the terminal, and the ultrasonic receipt signal is received using an audio receiver of the terminal. Thus, it may improve the efficiency of the implementation by simplifying the solution.

Figure 5:
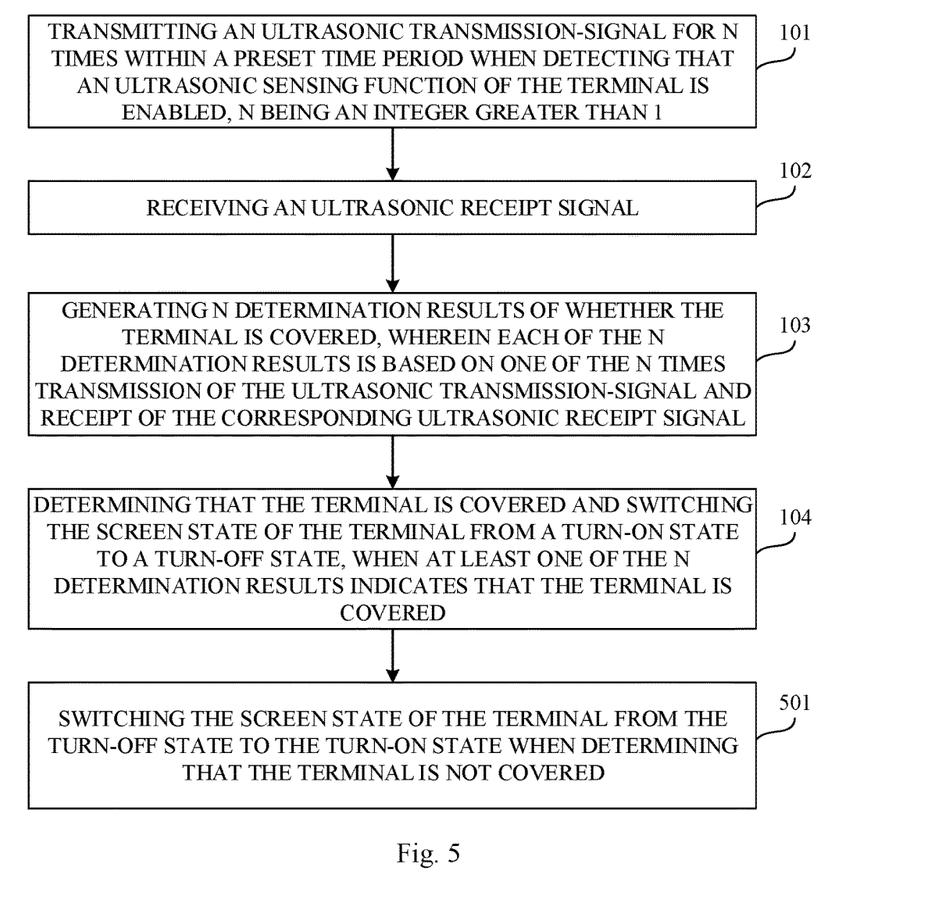
FIG. 5 is a flowchart illustrating a method for controlling a screen state according to an exemplary embodiment.

In one implementation, as shown in FIG. 5, the method for controlling a screen state according to the present disclosure may further include the following steps.

At step 501, after the screen state of the terminal is switched to the turn-off state, switching the screen state of the terminal from the turn-off state to the turn-on state when determining that the terminal is not covered.

In one embodiment, after step 104 is performed, another determination of whether the terminal is covered can be made again by performing step 501. When it is determined that the terminal is not covered, the screen state of the terminal is switched from the turn-off state to a turn-on state. As an example, the aforesaid another determination may be performed by determining continuously or periodically.

In the embodiment of the present disclosure, the detecting of obstruction is still going on after the screen state of the terminal is switched to a turn-off state, and the screen state of the terminal is switched from the turn-off state to the turn-on state when determining that the terminal is not covered. Thus, it may facilitate user operation, and improve user experience.

The implementation will be specifically described below with reference to some examples.

Figure 6:
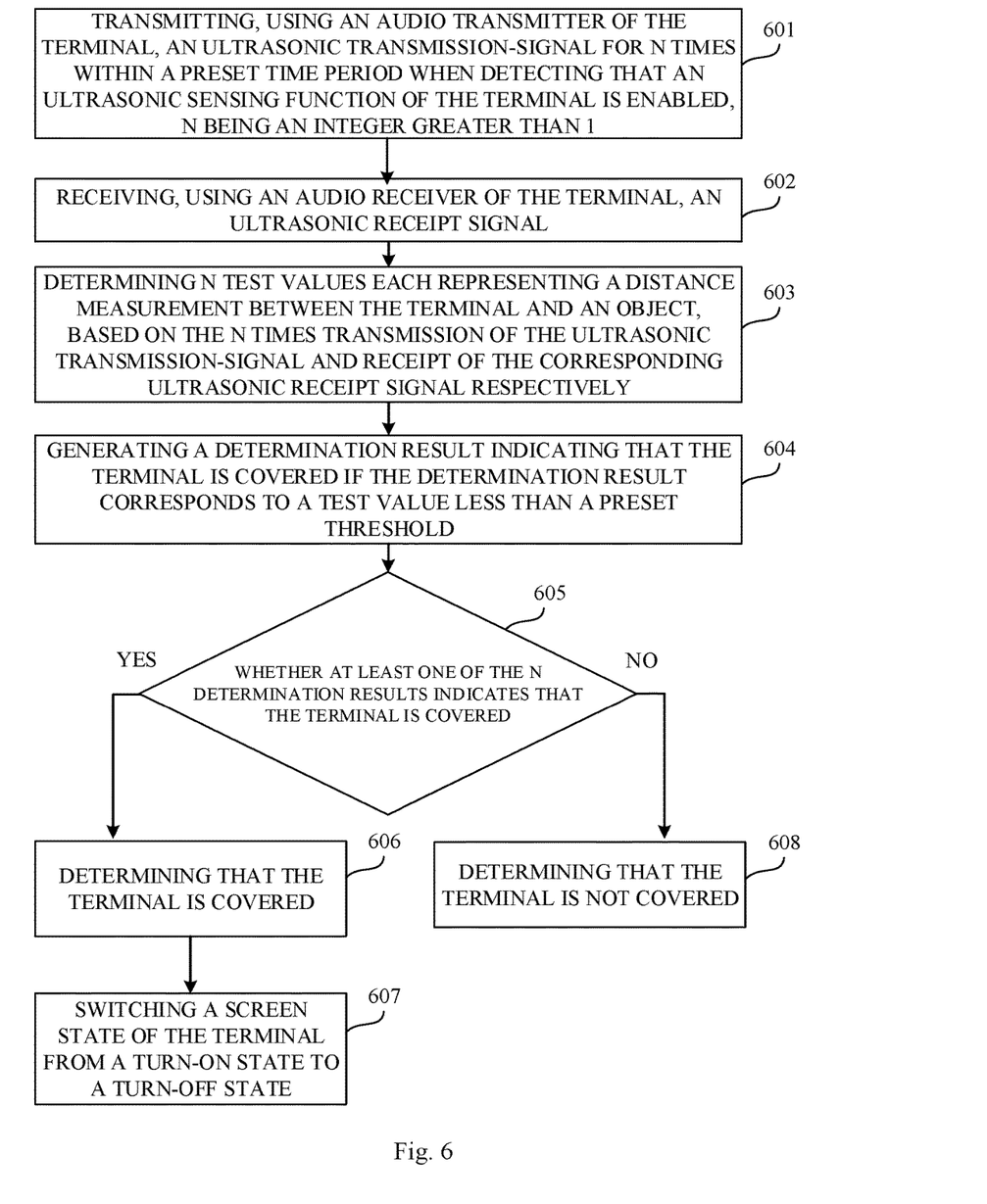
FIG. 6 is a flowchart illustrating a method for controlling a screen state according to an exemplary embodiment.

FIG. 6 is a flowchart illustrating a method for controlling a screen state according to an exemplary embodiment. The method may be performed by a terminal. As shown in FIG. 6, the method includes the following steps.

At step 601, transmitting, using an audio transmitter of the terminal, an ultrasonic transmission-signal for N times within a preset time period when detecting that an ultrasonic sensing function of the terminal is enabled, N being an integer greater than 1.

At step 602, receiving, using an audio receiver of the terminal, an ultrasonic receipt signal.

At step 603, determining N test values each representing a distance measurement between the terminal and an object, based on the N times transmission of the ultrasonic transmission-signal and receipt of the corresponding ultrasonic receipt signal respectively.

As an example, each of the N test values is determined according to an ultrasonic propagation speed, a sending time of the ultrasonic transmission-signal and a receipt time of the corresponding ultrasonic receipt signal.

Alternatively, each of the N test values is determined according to a difference between an amplitude of the ultrasonic transmission-signal and an amplitude of the corresponding ultrasonic receipt signal.

At step 604, generating a determination result indicating that the terminal is covered if the determination result corresponds to a test value less than a preset threshold.

At step 605, determining whether at least one of the N determination results indicates that the terminal is covered. When at least one of the N determination results indicates that the terminal is covered, step 606 is performed, and when none of the N determination results indicates that the terminal is covered, step 608 is performed.

At step 606, determining that the terminal is covered.

At step 607, switching a screen state of the terminal from a turn-on state to a turn-off state, and the process is ended.

At step 608, determining that the terminal is not covered.

In the embodiment of the present disclosure, whether the terminal is covered is determined by obtaining a value of the determination result for successive N times within a certain time period. Thus, it may improve the accuracy of the determination, and overcome the defects in the related art where incorrect determination causes misjudgment operation such as screen flickering. As a result, user experience can be improved.

In the related art, after an ultrasonic sensing function of a terminal (such as a mobile device) is enabled, if an object covering the terminal is moving, the terminal may properly determine that the existing of the object, and thus detect a distance from the object. However, if the object, which e.g. covers the ultrasonic-related portion of the terminal, does not move during a time period, it may be determined that the object is not existing and the ultrasonic function will not be performed. Thus, the determination may not be accurate, and may cause misjudgment operation such as screen flickering.

In an embodiment, when the ultrasonic sensing function is enabled, an initial determination mechanism is provided. That is, after the ultrasonic sensing function is enabled, whether the terminal is covered is determined by obtaining a value of the determination result for successive N times within a certain time period. Thus, it may improve the accuracy of the determination, and avoid misjudgment operation such as screen flickering caused by incorrect ultrasonic determination.

The implementation of determining a distance from an object to a terminal by ultrasonic may include: transmitting a sound wave of fixed frequency successively by a speaker (or an ultrasonic sounder) of the terminal and receiving acoustic data reflected from the object by a microphone of the terminal, and calculating a distance from the object to the terminal by any of the following approaches. The first approach is that the distance from the object to the terminal is calculated in real time according to a difference between a sending time of the ultrasonic transmission-signal and a receipt time of the corresponding ultrasonic receipt signal, and the propagation speed of the sound wave. The second approach is that the distance from the object to the terminal is calculated in real time according to an energy attenuation ratio of the received sound wave (i.e. the change in the amplitude of the sound wave). Since the transmitted ultrasonic may be attenuated when it is received, the frequency response curve of the received sound wave will present an amplitude deviation compared with the frequency response curve of the transmitted sound wave. When sound waves of different frequencies are transmitted and then received, a certain frequency, at which the amplitude deviation is the smallest, may be determined as the frequency best suitable for the device.

When the ultrasonic sensing function of the terminal is enabled, an initial determination mechanism is performed. That is, after the ultrasonic sensing function is enabled, whether the terminal is covered is determined by obtaining a value of the determination result for successive N times within a certain time period (the specific time period is not limited). N is larger than 1. If one or more of the N times of the test values indicate that an obstruction exists in front of the terminal, it is determined that an obstruction does exist in front of the terminal. If none of the N times of the test values indicates that an obstruction exists in front of the terminal, it is determined that no obstruction exists in front of the terminal. Thus, it may improve the accuracy of the determination, and avoid misjudgment operation such as screen flickering caused by incorrect ultrasonic determination.

A device according to embodiments of the present disclosure will be described below, which may be configured to perform the method according to embodiments of the present disclosure.

Figure 7:
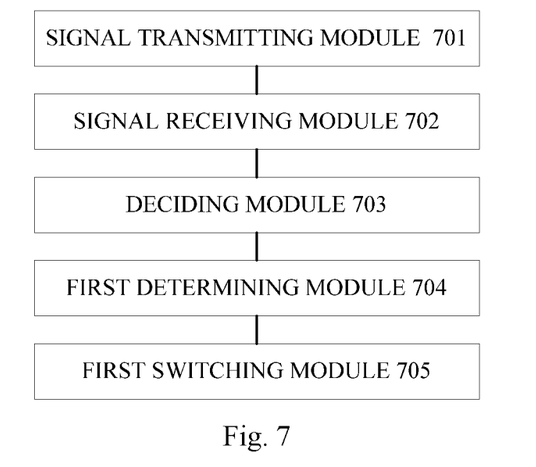
FIG. 7 is a block diagram illustrating a device for controlling a screen state according to an exemplary embodiment.

FIG. 7 is a block diagram illustrating a device for controlling a screen state according to an exemplary embodiment. The device may perform the method of the present disclosure by software, hardware or combination of both. As shown in FIG. 7, the device for controlling a screen state includes a signal transmitting module 701, a signal receiving module 702, a deciding module 703, a first determining module 704 and a first switching module 705.

The signal transmitting module 701 is configured to transmit an ultrasonic transmission-signal for N times within a preset time period when detecting that an ultrasonic sensing function of the terminal is enabled, N being an integer greater than 1.

The signal receiving module 702 is configured to receive an ultrasonic receipt signal.

The deciding module 703 is configured to generate N determination results of whether the terminal is covered, wherein each of the N determination results is based on one of the N times transmission of the ultrasonic transmission-signal and receipt of the corresponding ultrasonic receipt signal.

The first determining module 704 is configured to determine that the terminal is covered when at least one of the N determination results indicates that the terminal is covered.

The first switching module 705 is configured to switch the screen state of the terminal from a turn-on state to a turn-off state.

In the device for controlling a screen state according to the above embodiment of the present disclosure, whether the terminal is covered is determined by obtaining a value of the determination result for successive multiple times within a certain time period. Thus, it may improve the accuracy of the determination, and overcome the defects in the related art where incorrect determination causes misjudgment operation such as a screen flickering. As a result, user experience can be improved.

Figure 8:
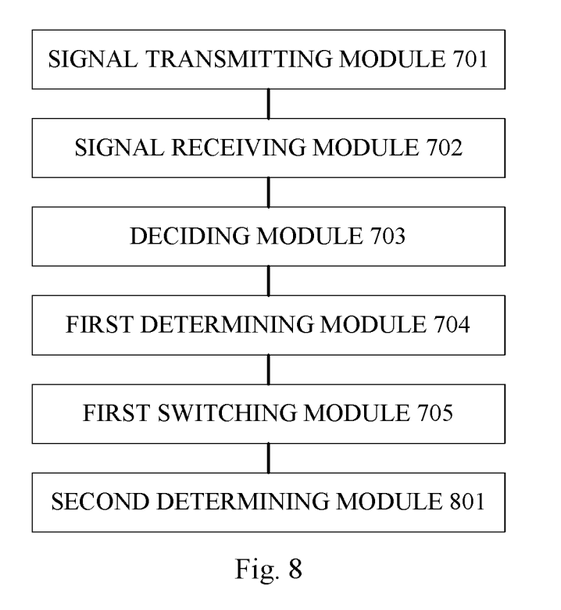
FIG. 8 is a block diagram illustrating a device for controlling a screen state according to an exemplary embodiment.

In one implementation, as shown in FIG. 8, the device for controlling a screen state disclosed above may also include: a second determining module 801. The second determining module 801 is configured to determine that the terminal is not covered when none of the N determination results indicates that the terminal is covered.

Figure 9:
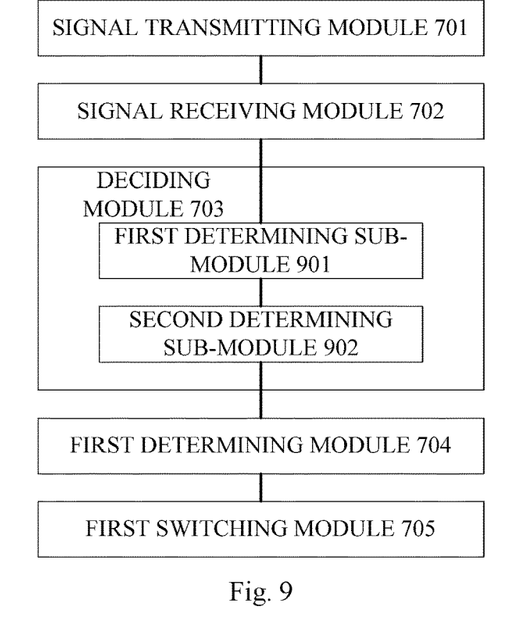
FIG. 9 is a block diagram illustrating a device for controlling a screen state according to an exemplary embodiment.

In one implementation, as shown in FIG. 9, the device for controlling a screen state disclosed above may also configure the deciding module 703 to include: a first determining sub-module 901 and a second determining sub-module 902.

The first determining sub-module 901 is configured to determine N test values each representing a distance measurement between the terminal and an object, based on the N times transmission of the ultrasonic transmission-signal and receipt of the corresponding ultrasonic receipt signal respectively.

The second determining sub-module 902 is configured to generate a determination result indicating that the terminal is covered if the determination result corresponds to a test value less than a preset threshold.

Optionally, the first determining sub-module 901 is configured to determine each of the N test values according to an ultrasonic propagation speed, a sending time of the ultrasonic transmission-signal and a receipt time of the corresponding ultrasonic receipt signal.

Optionally, the first determining sub-module 901 is configured to determine each of the N test values according to a difference between an amplitude of the ultrasonic transmission-signal and an amplitude of the corresponding ultrasonic receipt signal.

Optionally, the signal transmitting module 701 is configured to transmit the ultrasonic transmission-signal using an audio transmitter of the terminal; and the signal receiving module 702 is configured to receive the ultrasonic receipt signal using an audio receiver of the terminal.

Figure 10:
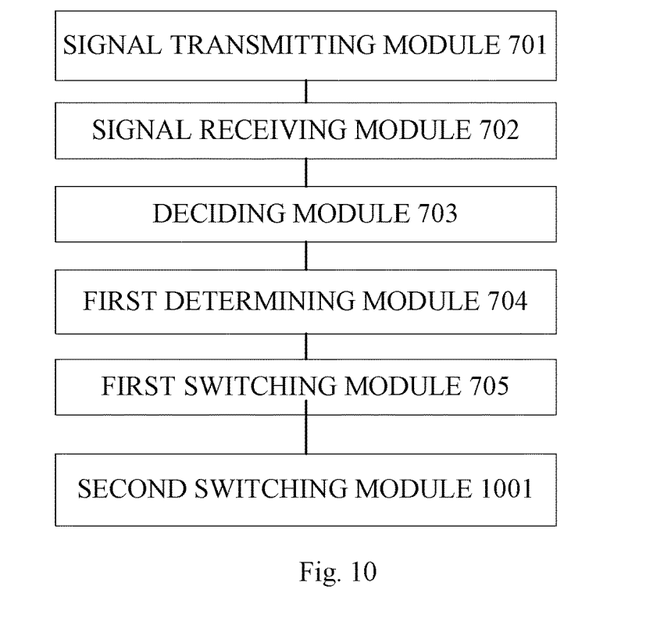
FIG. 10 is a block diagram illustrating a device for controlling a screen state according to an exemplary embodiment.

In one implementation, as shown in FIG. 10, the device for controlling a screen state disclosed above may also include: a second switching module 1001. The second switching module 1001 is configured to, after the screen state of the terminal is switched to the turn-off state by the first switching module, switch the screen state of the terminal from the turn-off state to the turn-on state when determining that the terminal is not covered.

Figure 11:
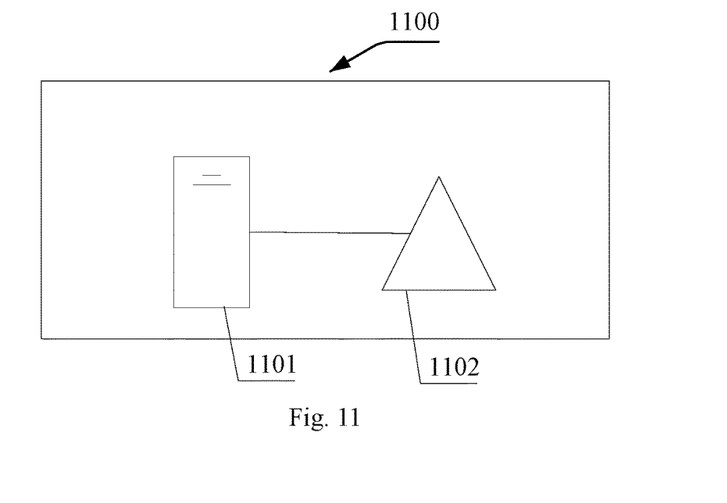
FIG. 11 is a block diagram illustrating a device for controlling a screen state according to an exemplary embodiment.

FIG. 11 is a block diagram illustrating a device 1100 for controlling a screen state according to an exemplary embodiment. The device 1100 includes:

a processor 1101; and a memory 1102 for storing instructions executable by the processor;

wherein the processor 1101 is configured to: transmit an ultrasonic transmission-signal for N times within a preset time period when detecting that an ultrasonic sensing function of the device is enabled, N being an integer greater than 1; receive an ultrasonic receipt signal; determine N determination results of whether the terminal is covered, wherein each of the N determination results is based on one of the N times transmission of the ultrasonic transmission-signal and receipt of the corresponding ultrasonic receipt signal; and determine that the device is covered and switch the screen state of the device from a turn-on state to a turn-off state when at least one of the N determination results indicates that the device is covered.

In one embodiment, the processor 1101 may also be configured to determine that the device is not covered when none of the N determination results indicates that the device is covered.

In one embodiment, the processor 1101 may also be configured to determine N test values each representing a distance measurement between the terminal and an object based on the N times transmission of the ultrasonic transmission-signal and receipt of the corresponding ultrasonic receipt signal; and generate a determination result indicating that the terminal is covered if the determination result corresponds to a test value less than a preset threshold.

In one embodiment, the processor 1101 may also be configured to determine each of the N test values according to an ultrasonic propagation speed, a sending time of the ultrasonic transmission-signal and a receipt time of the corresponding ultrasonic receipt signal.

In one embodiment, the processor 1101 may also be configured to determine each of the N test values according to a difference between an amplitude of the ultrasonic transmission-signal and an amplitude of the corresponding ultrasonic receipt signal.

In one embodiment, the processor 1101 may also be configured to transmit the ultrasonic transmission-signal using an audio transmitter of the terminal, and receive the ultrasonic receipt signal using an audio receiver of the terminal.

In one embodiment, the processor 1101 may also be configured to switch the screen state of the device from the turn-off state to the turn-on state when determining that the device is not covered.

With the device for controlling a screen state provided by the embodiment of the present disclosure, whether the terminal is covered can be determined by a value of the determination result for successive multiple times within a certain time period. Thus, it may improve the accuracy of the determination, and overcome the defects in the related art where incorrect determination causes misjudgment operation such as a screen flickering. As a result, user experience can be improved.

With respect to the test apparatus in the above embodiments, the specific manners for performing operations for individual modules therein have been described in detail in the embodiments regarding the relevant methods, which will not be elaborated herein.

Figure 12:
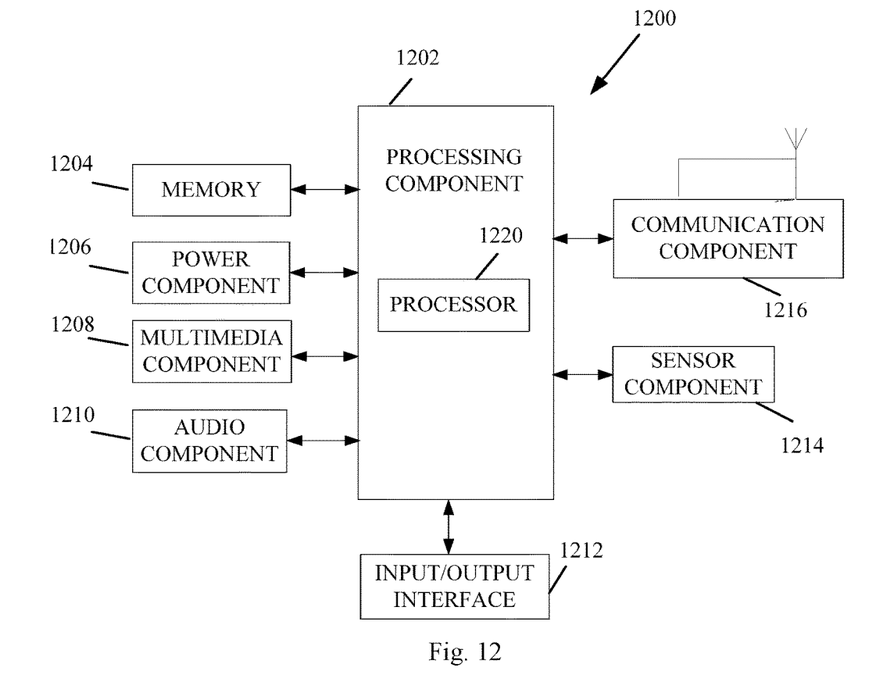
FIG. 12 is a block diagram illustrating a device for controlling a screen state according to an exemplary embodiment.

FIG. 12 is a block diagram illustrating a device for controlling a screen state according to an exemplary embodiment. The device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 is configured to store various types of data to support the operation of the device 1200. Examples of such data include instructions for any applications or methods operated on the device 1200 for controlling a screen state, contact data, phonebook data, messages, pictures, videos, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 provides power to various components of the device 1200. The power component 1206 may include a power management system, one or more power sources, and any other components associated with the generation, management, and distribution of power in the device 1200.

The multimedia component 1208 includes a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 includes a front camera and/or a rear camera. The front camera and/or the rear camera may receive an external multimedia datum when the device 1200 is in an operation mode, such as a photographing mode or a video mode. Each of the front camera and the rear camera may be a fixed optical lens system or have focus and optical zoom capability.

The audio component 1210 is configured to output and/or input audio signals. For example, the audio component 1210 includes a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 further includes a speaker to output audio signals.

The I/O interface 1212 provides an interface between the processing component 1202 and peripheral interface modules, such as a keyboard, a click wheel, buttons, and the like. The buttons may include, but are not limited to, a home button, a volume button, a starting button, and a locking button.

The sensor component 1214 includes one or more sensors to provide various aspects of status assessments for the device 1200. For instance, the sensor component 1214 may detect an open/closed status of the device 1200, relative positioning of components of the device 1200, e.g., the display and the keypad. The sensor component 1214 may further detect a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 is configured to facilitate communication, wired or wirelessly, between the device 1200 and other devices. The device 1200 can access a wireless network based on a communication standard, such as WiFi, 2G or 3G or a combination thereof. In one exemplary embodiment, the communication component 1216 receives a broadcast signal or broadcast associated information from an external broadcast management system via a broadcast channel. In one exemplary embodiment, the communication component 1216 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium (e.g. the memory 1204) including instructions, the instructions being executable by the processor 1220 in the device 1200 for performing the above-described methods. For example, the non-transitory computer-readable storage medium may be a ROM, a random access memory (RAM), a CD-ROM, a magnetic tape, a floppy disc, an optical data storage device, and the like.

A non-transitory computer readable storage medium, when instructions in the storage medium are executed by the processor of the device 1200, enables the device 1200 to perform the method as described above. The method includes:

transmitting an ultrasonic transmission-signal for N times within a preset time period when detecting that an ultrasonic sensing function of the terminal is enabled, N being an integer greater than 1;

receiving an ultrasonic receipt signal;

generating N determination results of whether the terminal is covered, wherein each of the N determination results is based on one of the N times transmission of the ultrasonic transmission-signal and receipt of the corresponding ultrasonic receipt signal; and determining that the terminal is covered and switching the screen state of the terminal from a turn-on state to a turn-off state, when at least one of the N determination results indicates that the terminal is covered.

In one embodiment, the method further includes: determining that the terminal is not covered when none of the N determination results indicates that the terminal is covered.

In one embodiment, generating N determination results of whether the terminal is covered, wherein each of the N determination results is based on one of the N times transmission of the ultrasonic transmission-signal and receipt of the corresponding ultrasonic receipt signal comprises: determining N test values each representing a distance measurement between the terminal and an object, based on the N times transmission of the ultrasonic transmission-signal and receipt of the corresponding ultrasonic receipt signal respectively; and generating a determination result indicating that the terminal is covered if the determination result corresponds to a test value less than a preset threshold.

In one embodiment, determining the N test values each representing a distance measurement between the terminal and an object, based on the N times transmission of the ultrasonic transmission-signal and receipt of the corresponding ultrasonic receipt signal respectively comprises: determining each of the N test values according to an ultrasonic propagation speed, a sending time of the ultrasonic transmission-signal and a receipt time of the corresponding ultrasonic receipt signal.

In one embodiment, determining the N test values of the distance between the terminal and the object based on the N times of ultrasonic transmission-signal and corresponding ultrasonic receipt signal comprises: determining each of the N test values according to a difference between an amplitude of the ultrasonic transmission-signal and an amplitude of the corresponding ultrasonic receipt signal.

In one embodiment, transmitting the ultrasonic transmission-signal for N times within the preset time period and receiving the ultrasonic receipt signal comprises: transmitting the ultrasonic transmission-signal using an audio transmitter of the terminal, and receiving the ultrasonic receipt signal using an audio receiver of the terminal.

In one embodiment, after the screen state of the terminal is switched to the turn-off state, the method further includes: switching the screen state of the terminal from the turn-off state to the turn-on state when determining that the terminal is not covered.

Figure 13:
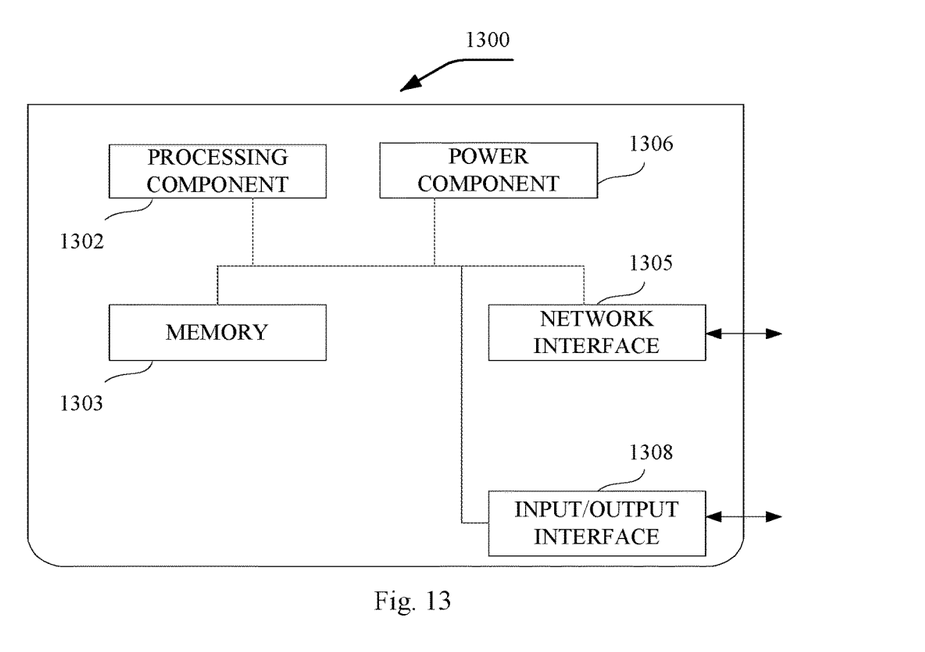
FIG. 13 is a block diagram illustrating a device for controlling a screen state according to an exemplary embodiment.

FIG. 13 is a block diagram of a device for controlling a screen state according to an exemplary embodiment. For example, the device 1300 may be provided as a server. The device 1300 includes a processing component 1302 that further includes one or more processors, and memory resources represented by a memory 1303 for storing instructions executable by the processing component 1302, such as application programs. The application programs stored in the memory 1303 may include one or more modules each corresponding to a set of instructions. Further, the processing component 1302 is configured to execute the instructions to perform the above described method.

The device 1300 may also include a power component 1306 configured to perform power management of the device 1300, wired or wireless network interface(s) 1305 configured to connect the device 1300 to a network, and an input/output (I/O) interface 1308. The device 1300 may operate based on an operating system stored in the memory 1303, such as Windows Server™, Mac OS X™, Unix™, Linux™, FreeBSD™, or the like.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for controlling a screen state of a terminal, the method comprising:
   transmitting an ultrasonic transmission-signal for N times within a preset time period when detecting that an ultrasonic sensing function of the terminal is enabled, N being an integer greater than 1;
   receiving an ultrasonic receipt signal;
   generating N determination results of whether the terminal is covered, wherein each of the N determination results is based on one of the N times transmission of the ultrasonic transmission-signal and receipt of the corresponding ultrasonic receipt signal;
   determining that the terminal is covered and switching the screen state of the terminal from a turn-on state to a turn-off state, when at least one of the N determination results indicates that the terminal is covered; and
   wherein generating N determination results of whether the terminal is covered, wherein each of the N determination results is based on one of the N times transmission of the ultrasonic transmission-signal and receipt of the corresponding ultrasonic receipt signal comprises:
      determining N test values each representing a distance measurement between the terminal and an object, based on the N times transmission of the ultrasonic transmission-signal and receipt of the corresponding ultrasonic receipt signal respectively; and
      generating a determination result indicating that the terminal is covered if the determination result corresponds to a test value less than a preset threshold.

2. The method according to claim 1, further comprising:
   determining that the terminal is not covered when none of the N determination results indicates that the terminal is covered.

3. The method according to claim 1, wherein determining the N test values each representing a distance measurement between the terminal and an object, based on the N times transmission of the ultrasonic transmission-signal and receipt of the corresponding ultrasonic receipt signal respectively comprises:
   determining each of the N test values according to an ultrasonic propagation speed, a sending time of the ultrasonic transmission-signal and a receipt time of the corresponding ultrasonic receipt signal.

4. The method according to claim 1, wherein determining the N test values representing the distance measurement between the terminal and the object based on the N times transmission of the ultrasonic transmission-signal and receipt of the corresponding ultrasonic receipt signal respectively comprises:
   determining each of the N test values according to a difference between an amplitude of the ultrasonic transmission-signal and an amplitude of the corresponding ultrasonic receipt signal.

5. The method according to claim 1, wherein transmitting the ultrasonic transmission-signal for N times within the preset time period and receiving the ultrasonic receipt signal comprises:
   transmitting the ultrasonic transmission-signal using an audio transmitter of the terminal, and receiving the ultrasonic receipt signal using an audio receiver of the terminal.

6. The method according to claim 1, wherein after the screen state of the terminal is switched to the turn-off state, the method further comprises:
   switching the screen state of the terminal from the turn-off state to the turn-on state when determining that the terminal is not covered.

7. A device for controlling a screen state, the device comprising:
   a processor; and
   a memory for storing instructions executable by the processor;
   wherein the processor is configured to:

transmit an ultrasonic transmission-signal for N times within a preset time period when detecting that an ultrasonic sensing function of the device is enabled, N being an integer greater than 1;
receive an ultrasonic receipt signal;
determine N determination results of whether the terminal is covered, wherein each of the N determination results is based on one of the N times transmission of the ultrasonic transmission-signal and receipt of the corresponding ultrasonic receipt signal;
determine that the device is covered and switch the screen state of the device from a turn-on state to a turn-off state when at least one of the N determination results indicates that the device is covered; and
wherein the processor is further configured to:
determine N test values each representing a distance measurement between the terminal and an object based on the N times transmission of the ultrasonic transmission-signal and receipt of the corresponding ultrasonic receipt signal; and
generate a determination result indicating that the terminal is covered if the determination result corresponds to a test value less than a preset threshold.

8. The device according to claim 7, wherein the processor is further configured to:
determine that the device is not covered when none of the N determination results indicates that the device is covered.

9. The device according to claim 7, wherein the processor is further configured to:
determine each of the N test values according to an ultrasonic propagation speed, a sending time of the ultrasonic transmission-signal and a receipt time of the corresponding ultrasonic receipt signal.

10. The device according to claim 7, wherein the processor is further configured to:
determine each of the N test values according to a difference between an amplitude of the ultrasonic transmission-signal and an amplitude of the corresponding ultrasonic receipt signal.

11. The device according to claim 7, wherein the processor is further configured to:
transmit the ultrasonic transmission-signal using an audio transmitter of the terminal, and receive the ultrasonic receipt signal using an audio receiver of the terminal.

12. The device according to claim 7, wherein after the screen state of the device is switched to the turn-off state, the processor is further configured to:
switch the screen state of the device from the turn-off state to the turn-on state when determining that the device is not covered.

13. A non-transitory computer-readable storage medium having stored therein instructions that, when executed by a processor of a terminal, causes the terminal to perform a method for controlling a screen state of the terminal, the method comprising:
transmitting an ultrasonic transmission-signal for N times within a preset time period when detecting that an ultrasonic sensing function of the terminal is enabled, N being an integer greater than 1;
receiving an ultrasonic receipt signal;
generating N determination results of whether the terminal is covered, wherein each of the N determination results is based on one of the N times transmission of the ultrasonic transmission-signal and receipt of the corresponding ultrasonic receipt signal;
determining that the terminal is covered and switching the screen state of the terminal from a turn-on state to a turn-off state, when at least one of the N determination results indicates that the terminal is covered; and
wherein generating N determination results of whether the terminal is covered, wherein each of the N determination results is based on one of the N times transmission of the ultrasonic transmission-signal and receipt of the corresponding ultrasonic receipt signal comprises:
determining N test values each representing a distance measurement between the terminal and an object, based on the N times transmission of the ultrasonic transmission-signal and receipt of the corresponding ultrasonic receipt signal respectively; and
generating a determination result indicating that the terminal is covered if the determination result corresponds to a test value less than a preset threshold.

14. The storage medium according to claim 13, wherein the method further comprises:
determining that the terminal is not covered when none of the N determination results indicates that the terminal is covered.

15. The storage medium according to claim 13, wherein determining the N test values each representing a distance measurement between the terminal and an object, based on the N times transmission of the ultrasonic transmission-signal and receipt of the corresponding ultrasonic receipt signal respectively comprises:
determining each of the N test values according to an ultrasonic propagation speed, a sending time of the ultrasonic transmission-signal and a receipt time of the corresponding ultrasonic receipt signal.

16. The storage medium according to claim 13, wherein determining the N test values of the distance between the terminal and the object based on the N times of ultrasonic transmission-signal and corresponding ultrasonic receipt signal comprises:
determining each of the N test values according to a difference between an amplitude of the ultrasonic transmission-signal and an amplitude of the corresponding ultrasonic receipt signal.

17. The storage medium according to claim 13, wherein transmitting the ultrasonic transmission-signal for N times within the preset time period and receiving the ultrasonic receipt signal comprises:
transmitting the ultrasonic transmission-signal using an audio transmitter of the terminal, and receiving the ultrasonic receipt signal using an audio receiver of the terminal.

* * * * *